US011144859B1

(12) United States Patent
Deegan et al.

(10) Patent No.: US 11,144,859 B1
(45) Date of Patent: Oct. 12, 2021

(54) COMPUTERIZED APPOINTMENT SCHEDULING SYSTEM AND METHOD

(75) Inventors: Kristin Deegan, Sausalito, CA (US); Karen Ann Yu, San Francisco, CA (US); Robert M. Caccia, San Francisco, CA (US); Katherine Joan McGee, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 508 days.

(21) Appl. No.: 13/028,177

(22) Filed: Feb. 15, 2011

Related U.S. Application Data (60) Provisional application No. 61/306,317, filed on Feb. 19, 2010.

(51) Int. Cl.
G06Q 10/06 (2012.01)
G06Q 10/10 (2012.01)

(52) U.S. Cl.
CPC ..... *G06Q 10/06314* (2013.01); *G06Q 10/109* (2013.01)

(58) Field of Classification Search
CPC ............ G06Q 10/1095; G06Q 10/109; G06Q 10/06314; G06Q 10/1093; G06Q 10/063116
See application file for complete search history.

(56) References Cited

U.S. PATENT DOCUMENTS

| | | | | |
|---|---|---|---|---|
| 5,093,901 A * | 3/1992 | Cree | ............... | G06Q 10/109 715/753 |
| 6,732,103 B1 * | 5/2004 | Strick | ............... | G06Q 10/109 |
| 2002/0029161 A1 * | 3/2002 | Brodersen | ............ | G06Q 10/1093 705/7.14 |
| 2002/0131565 A1 * | 9/2002 | Scheuring | ............ | G06Q 10/109 379/88.19 |
| 2007/0005406 A1 * | 1/2007 | Assadian | ............ | G06Q 10/1093 705/7.18 |
| 2007/0036320 A1 * | 2/2007 | Mandalia | ............ | H04M 3/42 379/210.01 |
| 2010/0070297 A1 * | 3/2010 | Kharraz Tavakol | ............ | G06Q 10/1095 705/2 |

FOREIGN PATENT DOCUMENTS

EP  2129113 A1 * 12/2009 ....... H04N 21/25891

OTHER PUBLICATIONS

P. Karger et al. What Do You Prefer? Using Preferences to Enhance Learning Technology. IEEE Transactions on Learning Technologies (vol. 1, Issue: 1, pp. 20-33) (Year: 2008).*

* cited by examiner

*Primary Examiner* — Patricia H Munson
*Assistant Examiner* — Nancy N Prasad
(74) *Attorney, Agent, or Firm* — Foley & Lardner LLP (57) ABSTRACT

A computer-implemented method for scheduling an appointment between a user and a resource of a financial institution that includes receiving, at a first computing system associated with the financial institution, a plurality of user preferences regarding the appointment from a user. The user preferences may be received while the user is using a second computing system to conduct a network-based session with the first computing system. The method includes, identifying, by a rules engine, at least one representative of the financial institution based on the user preferences received from the user and scheduling the appointment between the user and the representative based on the identification of the representative.

25 Claims, 8 Drawing Sheets

Access Point

Via Third Party Search Jump page

Get a Wells Fargo® Checking Account
- Wells Fargo Online® Bill Pay — try it free for two months[1]
- My Spending Report makes it easy to track your spending
- FREE Mobile Banking[2]

Apply Today

Get a Wells Fargo Savings Account
- Safety - Backed by the strength of Wells Fargo Bank and FDIC insured
- Free Online Statements or Paper Statements
- Interest earned on your entire daily collected balance Apply Today

Make an Appointment
Questions? Set up a time to speak with a banker at one of our stores*

≤ Back to Previous Page

Make an Appointmentsm

We Want Your Feedback

Need to chat with a banker in person about your financial needs ? Set up an appointment online to meet with a knowledgeable banker at the location below. We'll send you a confirmation by email when you've completed your request.

Make an Appointment (●) What would you like to do ?  * indicated required field Make a new appointment 405 — *Date: [Select: -day and date-]   *Time: [-Select Time-]

( ) Reschedule an existing appointment
( ) Cancel an existing appointment

At this location:
PLAZA
NUMBER STREET
TOWN STATE ZIP

407 — Type of Appointment
[In Person – at Branch Location]

Information
Please provide the information below.

410 — Your Name       [* Last Name]         [* First Name]
Email Address   [*name@domain.com]    [*confirm email address]

Phone Number    [    ] [    ] [    ]    Why do we ask for this? *

Optional Information

Mailing Address   [Address Line 1]    [City]
                  [Address Line 2]    [State] [Zip Code]

415 — Are you a Bank Customer?   ( ) Yes  ( ) No

What can we help you with ?

421 — [Purpose of the appointment]

420 — Customer Accounts       Business Accounts        Other Financial Needs
☐ Checking and Savings          ☐ Checking and Savings         ☐ Other products not listed here
☐ Loans and Lines of Credit     ☐ Loans and Lines of Credit
☐ Mortgage 422 — Attach Documents              426 — Language Preferences  [Spanish]
424 — Pending Transition ID [       ]      [Clear]  [Make Appointment]
                                                          427

Fig. 4

Print this page

503
Thank you for Scheduling an Appointment

You have scheduled an appointment with a banker at the location below. An email confirmation has also been sent to you Make a new appointment

| | | At this location: |
|---|---|---|
| *Appointment Date: | Tuesday, January 5, 2010 | PLAZA<br>NUMBER STREET |
| 505 *Time: | 11:00 AM | TOWN STATE ZIP<br>507 |
| Confirmation Number | 11293 | |

Reschedule or cancel your appointment

We want your feedback. What do you think of our Make an Appointment SM Service
509

| About The Bank | Careers Privacy, Security & Legal | Report Email Fraud | Sitemap |

Fig. 5

| From : | Bank | Appointments |
|---|---|---|
| To : | User's Email | |
| CC: | | |

Subject   Bank appointment scheduled 01/05/2010

601
Thank you for Scheduling an Appointment with a Banker through Our Make an Appointment Service You have scheduled an appointment with a banker at the location below. An email confirmation has also been sent to you bankwebsite.com Make a new appointment

| | | 603 |
|---|---|---|
| *Appointment Date: | Tuesday, January 5, 2010 | Additional document needed, if any: None |
| *Time: | 11:00 AM | |
| Confirmation Number : | 11293 | At this location: 605 |
| Your Name: | TestKristin TestDeegan | PLAZA           Get |
| Phone: | 111-111-1111 | NUMBER STREET    Directions |
| Confirmation Number | Your interests: | TOWN STATE ZIP |

Your interests:

You are a Bank Customer and you would like to discuss:
- Consumer Checking and Savings
- Consumer Mortgage
- Business Checking and Savings 607 You can reschedule or cancel your appointment. Just search for your desired location and client the *Make and Appointment* link
Thank you for your scheduling and appointment with a Wells Fargo banker, We look forward to seeing
609 you!
*Please confirm you availability.*
Sincerely,
Bank Help us improve your Make an Appointment service.
We invite you to participate in a survey to help up improve our *Make an Appointment* service. Please be assured that all of your responses will remain strictly confidential and will only be used to improve products and services at Bank. You will not be asked to provide any personal identifiable information. No Bank survey will ever ask you for your online banking log-in credentials, account number, password, Social Security number, or similar information. If you would like to review that Bank privacy policy, please visit our home page at bank.com

Fig. 6

//COMPUTERIZED APPOINTMENT SCHEDULING SYSTEM AND METHOD

CROSS-REFERENCE TO RELATED APPLICATIONS

This application claims priority from Provisional Application No. 61/306,317, filed Feb. 19, 2010, incorporated herein by reference in its entirety.

BACKGROUND OF THE INVENTION

The present invention relates generally to the field computerized appointment scheduling systems. With the proliferated use of the Internet, mobile telephones and automated customer service systems, businesses often interact with customers through a variety of different channels (e.g., in person, by telephone, through the internet, etc.). Enhanced mechanisms for permitting customers to interact with a business across multiple channels would be desirable.

SUMMARY

A communication device-implemented method for scheduling an appointment between a user and a resource of a financial institution, the method includes, receiving, at a first computing system associated with the financial institution, a plurality of user preferences regarding the appointment from a user, the user preferences being received while the user is using a communication device to conduct a network-based session with the first computing system. The method includes, identifying, by a rules engine, at least one financial institution resource based on the user preferences received from the user scheduling the appointment between the user and the resource based on the identification of the resource. The resources may be a financial institution store location or a representative.

BRIEF DESCRIPTION OF THE DRAWINGS

FIG. 6 is a message that may be sent to the user after scheduling an appointment according to an example embodiment.

DETAILED DESCRIPTION OF THE DISCLOSURE

Figure 1:
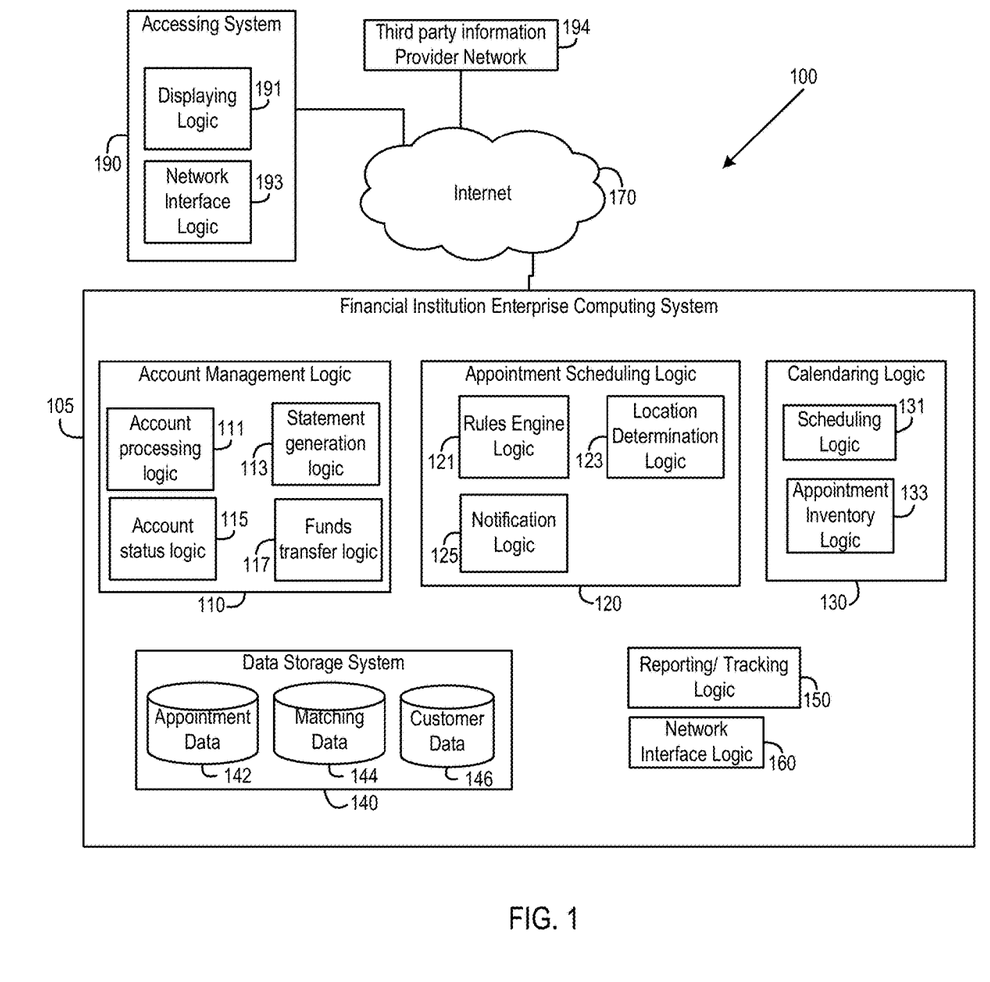
FIG. 1 is a schematic diagram of a computer-implemented processing system according to an example embodiment.

Referring to FIG. 1, FIG. 1 is a schematic diagram of a computer-implemented processing system 100 according to an example embodiment. The system 100 includes an enterprise computing system 105 that may be accessed by users to perform various tasks. In an example embodiment, system 105 is provided by a financial institution, and the users are customers of the financial institution that access system 105, e.g., through an on-line account area of a website of the financial institution or in another manner. For example, system 105 may be provided by a bank, and the users may be customers of the bank that access system 105 through an on-line banking area of a website of the bank. The user may access system 105 to perform tasks relating to managing their accounts at the financial institution. The user may be a business entity and/or an individual consumer who wants to consult with a representative at the financial institution, such as a banker, mortgage lender, mortgage consultant, investment advisor, financial advisor, specialist, customer service representative, and so on. The system 105 may be configured to assist the user with scheduling appoints with such representative.

Enterprise computing system 105 may include account management logic 110, appointment scheduling logic 120, calendaring logic 130, data storage system 140, reporting/tracking logic 150 and network interface logic 160. The enterprise computing system 105 (including logics 110-160) may comprise a computer system (e.g., one or more servers each with one or more processors) configured to execute stored instructions, send and receive data, and perform other operations to implement the operations described herein.

The account management logic 110 may include account processing logic 111, statement generation logic 113, account status logic 115 and funds transfer logic 117. The account processing logic 111 may process transactions in connection with the accounts held by an account holder, such as account debits and credits. For example, the transactions may also include electronic bill payment transactions in which monies from the checking account of the user are used to send funds to various entities. The account processing logic 111 may retrieve and store information in a data storage system 140. Statement generation logic 113 may generate statements for a customer relating to the customer's account. Account status logic 115 may generate codes that indicate account status, such as, current, delinquent, late, over the limit, in default, funds are being held for processing or the like. The funds transfer logic 117 may be used to transfer funds between accounts of a single account holder or between an account of an account holder and a third party. The fund transfer logic 117 may receive a fund transfer request from a customer through a teller, through the on-line banking area of the website, or through other systems.

The appointment scheduling logic 120 may include rules engine logic 121, location determination logic 123, and notification logic 125. The rules engine 121 may receive user preferences regarding personnel with whom the user would like to meet and, based on those preferences, match the user with the most qualified banker or other representative that best fits the user's needs. The rules logic 121 may access matching data 144 that may have qualifications of available bankers and other representatives. The rules logic 121 is described in greater detail in the context of FIG. 4.

The location determination logic 123 may use geo-coding (or the user's IP address) to determine the user's location. This information may then be used as an input by the rules engine logic 121 to identify bank locations and representatives that are closest to the user.

The notification logic 125 may be configured to send notifications to both the user and a qualified representative regarding the appointments. Once a user has chosen an appointment time and the representative for an appointment, the notification logic 125 may receive information and distribute the information regarding the appointment to the appropriate representative of the financial institution. The notification logic 125 may provide the representative with appointment information that includes the appointment time, location, user preferences, user's financial information available to the bank and the user's information provided by any third party sources. The third party sources may include credit agencies and other information databases. The notification logic 125 may also provide a notification/confirmation of the appointment to the user. The notification logic 125 may receive the user preferences regarding the mode of notification. For example, the user may specify that notifications should be sent as text messages, e-mails, calendar meeting requests, voice messages, or in another manner.

The calendaring logic 130 is configured to schedule and track meetings and other appointments for employees of the financial institution. For example, the calendaring logic may be part of an overall sales platform used by sales professionals within the financial institution. As another example, the calendaring logic 130 may be commercially available software, such as Microsoft Outlook.

The calendaring logic 130 includes scheduling logic 131 and appointment inventory logic 133. Scheduling logic 131 may be configured to schedule appointments. Scheduling logic 131 may also be configured to reschedule appointments, e.g., if a banker or other representative becomes unavailable or indicates a desire to cancel an appointment. When rescheduling is needed, the scheduling logic 131 informs the user (e.g., via e-mail notification) and attempts to receive the user's approval to reschedule the appoint at a new time. The scheduling logic 133 may also be accessible to users via the website of the financial institution so that the users may ascertain the times and dates of appointments they have scheduled with one or more representatives.

Appointment inventory logic 133 cooperates with the scheduling logic 131 and tracks all the scheduled appointments and the inventory of available timeslots for representatives of the financial institution. This information may be accessed by the rules engine 121, i.e., to prevent matching the user with a representative that is unavailable during the user's preferred time slot. Likewise, this information permits the scheduling logic to avoid scheduling a meeting between a user and a representative during a timeslot when the representative is unavailable.

The data storage system 140 may include appointment data 142, matching data 144 and customer data 146. The appointment data 142 may store the information regarding the scheduled appointments. The appointment data 142 may include appointments that have been scheduled and may reflect timeslots that each representative remains available for an appointment. In various embodiments, the appointment data 142 may be received as part of each representative's electronic calendar which may be part of a financial institution sales platform. In another embodiment, each representative may indicate their availability for an appointment on their electronic calendar. The appointment data 142 may provide data to appointment inventory logic 133 to facilitate the user's and the representative's inquires. The matching data 144 may store representative qualifications, and location of each banking service store. The customer data 146 may store data regarding the financial institution's current customers, including account balance and transaction information. If the user accessing the enterprise computing system 105 happens to be a customer, then the customer data 146 may provide customer account information to the representative.

The reporting/tracking logic 150 may receive post appointment information from the representative regarding the financial products that may have been recommended and the financial products chosen by the user. The tracking logic 150 permits appropriate sales credit to be assigned to the representative. Moreover, if further follow up is needed from an individual with a different set of expertise, the tracking logic 150 may inform the appropriate representative regarding the user's needs.

Network interface logic 160 may be used to connect the enterprise computing system 105 to the Internet to permit users to access the enterprise computing system 105, e.g., through an on-line banking website or other websites, ATM, chat or other mode of communication. For example, network interface logic 160 may comprise one or more computers or web servers that provide a graphical user interface (e.g., a series of dynamically-generated web pages) for users that access the enterprise computing system 105 through the Internet, or other means. An example of such a graphical user interface is described in greater detail below in connection with FIGS. 3-6. Network interface logic 160 may also comprise other logic that is configured to provide an interface for other types of devices such as mobile devices (e.g., cell phones, smart phones, mobile e-mail devices, and so on), fax machines, ATMs, server-based computing systems, and so on. Network interface logic 160 may be configured to send different types of signals depending on the type of device to cause such device to provide the relevant graphical user interface. The network interface logic 160 may provide access to application programming interfaces to various third party information provider network 194. The third party networks may include, information provided by Experian®, Equifax®, or Transunion® or the third party network may be a mobile communication network that allows the user access to the Internet on a mobile device. In various embodiments, third parties such as, real estate companies, brokers, agents, car dealership, appliance stores may be able to provide access the computing system 105 through access points as discussed in connection with FIG. 3c. The third parties may also schedule appointments for their customers with a representative.

The enterprise computing system 105 may be connected through a network 170 to various user systems 190. The network 170 may include one or more of the Internet, cellular network, Wi-Fi, Wi-Max, proprietary banking network, and so on.

Each user system 190 may include display logic 191, a network interface logic 193 and other computer components such as memory and processor. The display logic 191 may comprise a screen that displays images and information to the user. The network interface logic 193 may be similar to the network 170. The accessing system 190 may be a computer system, automated teller machine (ATM), mobile device, cellular phone, store representative operated computer system, telephone, communication device or other systems that allow a user to search by preferences and allow the user to be presented with the options regarding an appointment with a representative.

Figure 2:
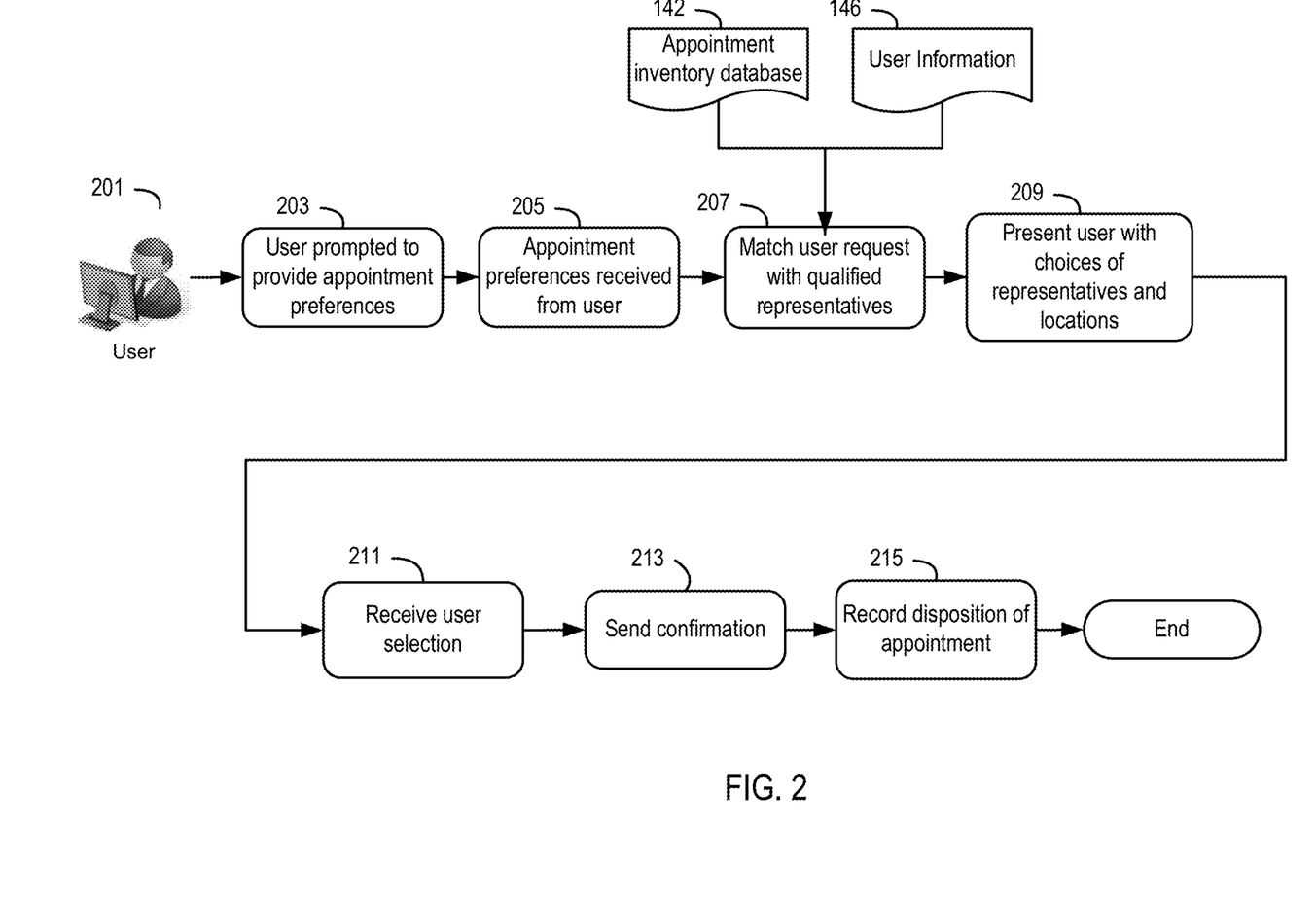
FIG. 2 is a process that may be implemented by the processing system of FIG. 1.
Figure 3A:
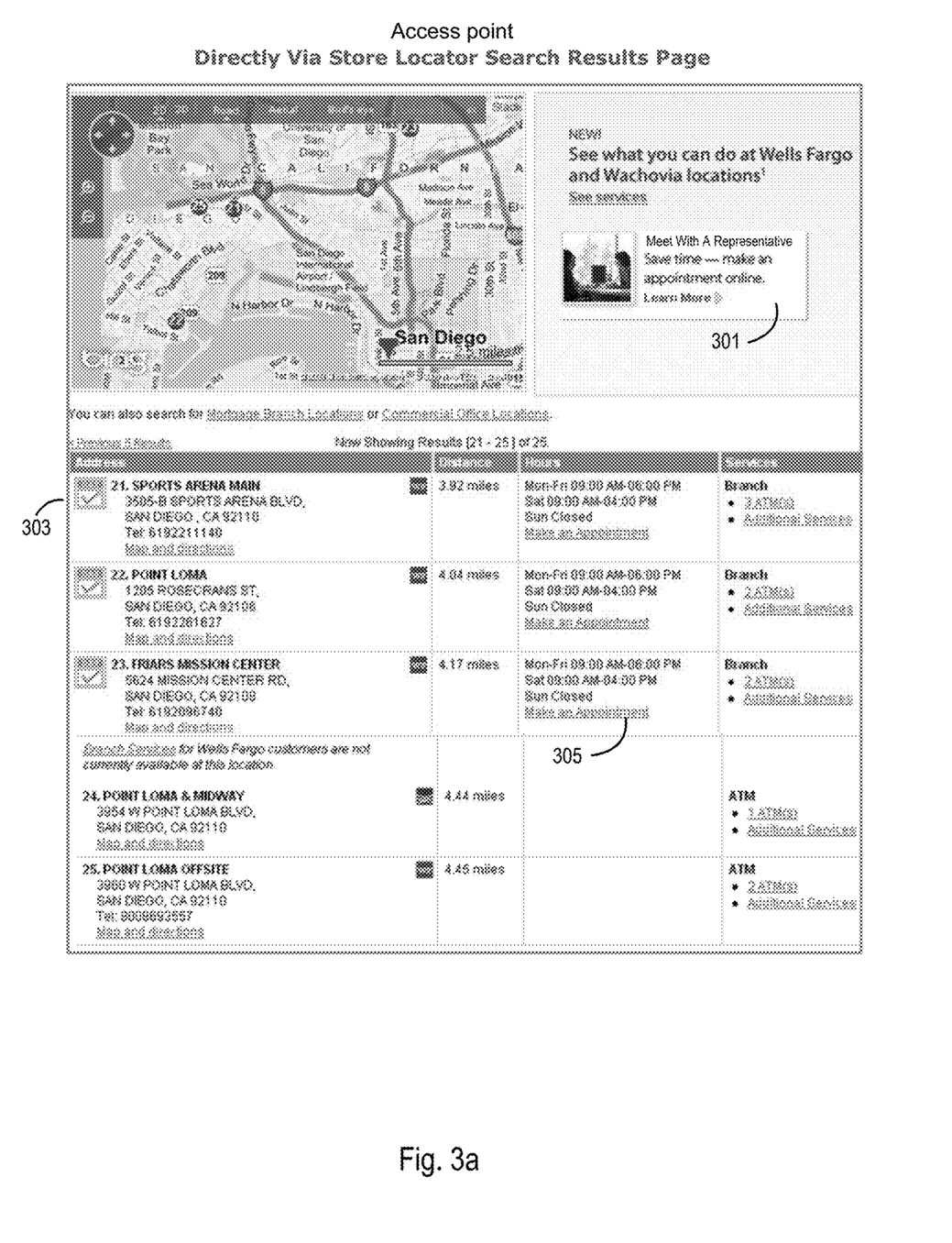
FIGS. 3a, 3b and 3c are screen shots showing various example access points accessing an appointment scheduling system of FIG. 1.
Figure 3B:
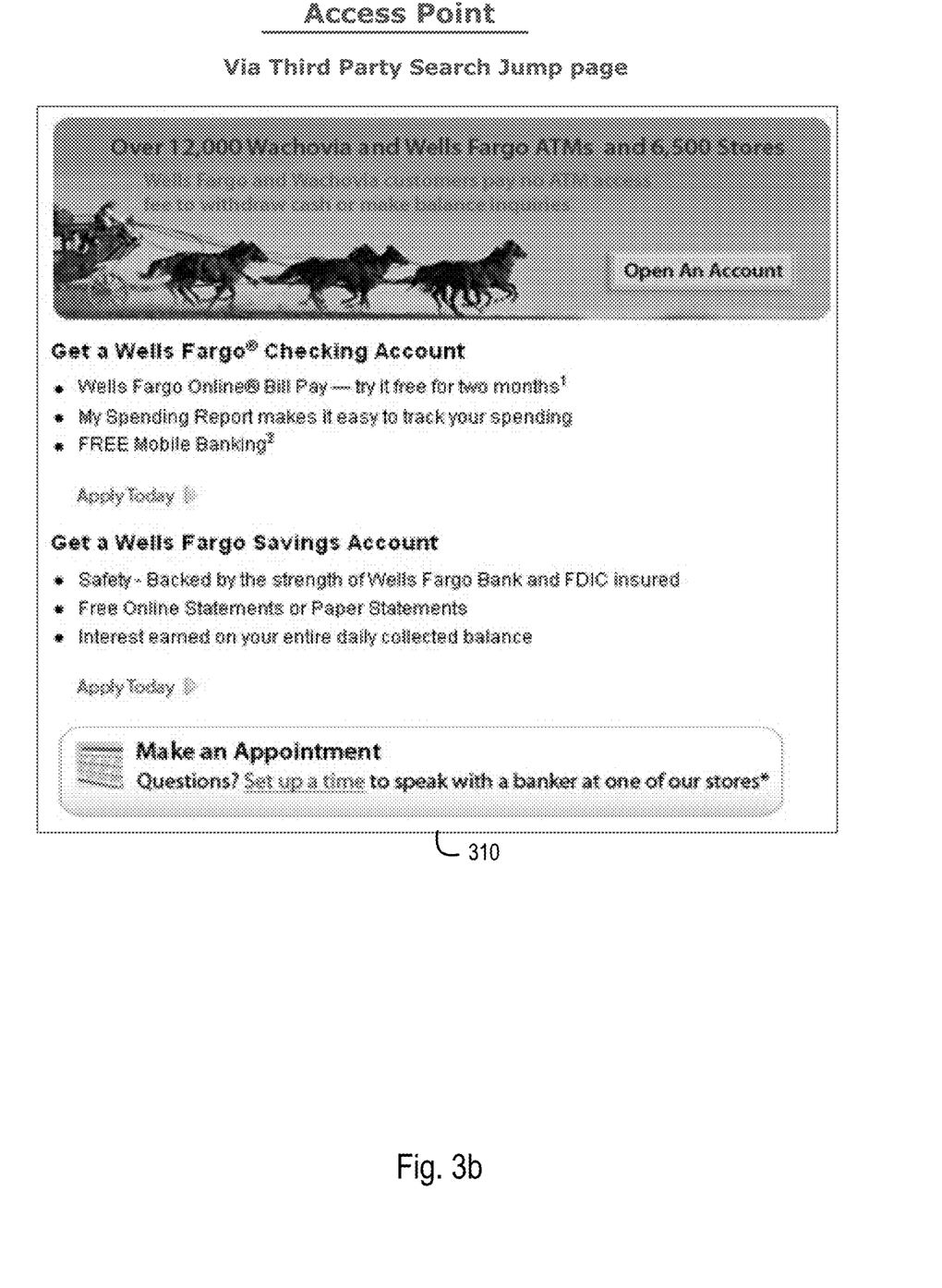
Figure 3C:
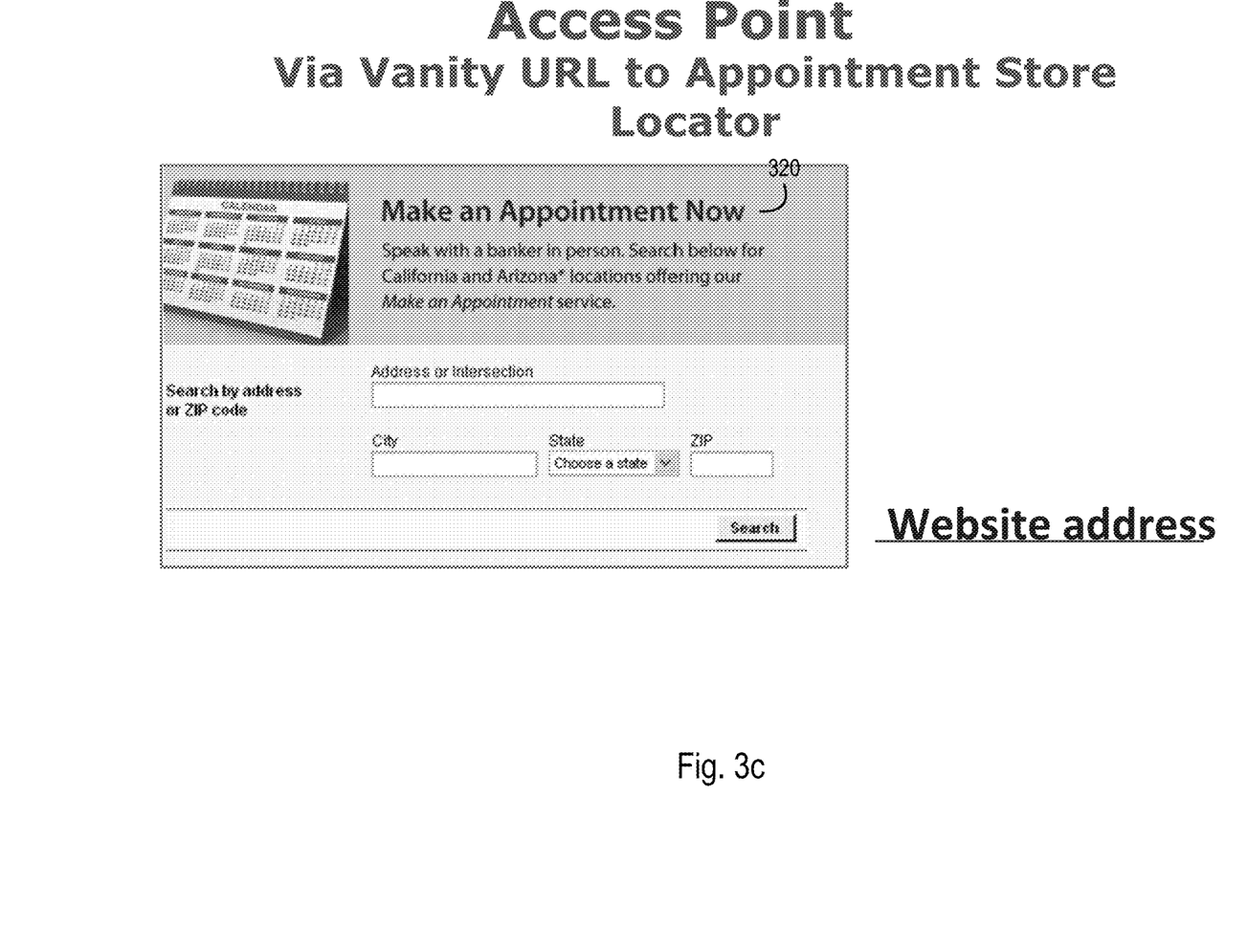

Referring to FIG. 2, FIG. 2 is an example process implemented by the computing system of FIG. 1. In FIG. 2, at step 201, a user may initiate communications with the enterprise computing system 105. For example, the user may access the computing system 105 through a publicly-accessible area of the website of the financial institution. The website may be configured for a personal computer (e.g., a desktop computer, a laptop computer, etc.) or a mobile wireless computing device (e.g., a cellular telephone, a handheld e-mail device, handheld music player, and so on). As another example, the user may access the computing system 105 by providing login and password information to obtain access to a secure area of the website of the financial institution which provides the user with access to their accounts. As another example, the user may access the computing system through an automated teller machine. After (or as part of) initiating communications with the computing system 105, communications are initiated with the appointment scheduling logic 120. FIGS. 3*a*-3*c*, discussed in greater detail below, show access points for initiating communications with the appointment scheduling logic 120.

Figure 4:
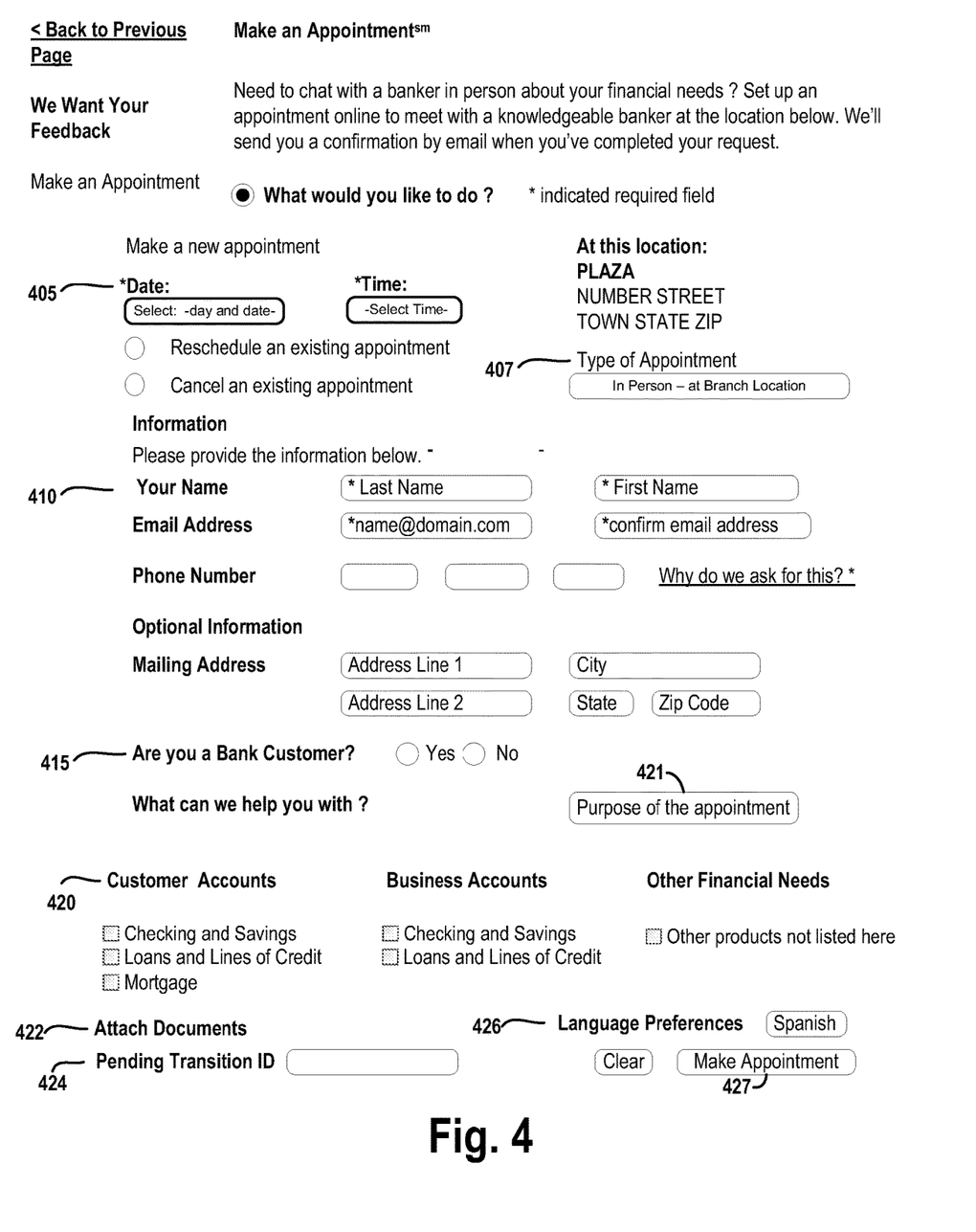
FIG. 4 is a screen shot of a form that allows a user to enter user preferences according to an example embodiment.

At step 203, the enterprise computing system 105 prompts the user to provide preference information regarding the appointment using an appointment form. The preferences may include the user submitting a time period for the appointment, subject matter of the appointment, preferred locations for the appointment (e.g., which branch location), language in which the appointment is to be conducted (e.g., English or Spanish), and so on. FIG. 4, discussed in greater detail below, shows an example of a screen that may be used to prompt a user for such information. At step 205, the form is received by the appointment scheduling logic 120.

At step 207, the rules engine logic 121 matches the user's request with qualified representatives. The rules engine logic 121 requests information from the appointment inventory database 133 and the user information 146 to provide the user with a plurality of choices between representatives and locations. For example, the availability of particular representatives meeting the user's criteria during the time period requested by the user may be validated by the rules engine logic before listing the representative as satisfying the user's search criteria and before scheduling an appointment with that representative. The operation of the rules engine logic 121 is discussed in greater detail below. At step 209, the choices are presented to the user.

Next, at step 211, the user is allowed to select an appointment period and a representative to consult with during the scheduled time period. As another example, the user may select an appointment period and a branch location, and the representative may be assigned based on the user's selection of the branch location. Once the user's selection is received, the selection may be processed by the scheduling logic 120. The scheduling logic 120 may send appropriate calendar requests to the chosen representative and inform the representative regarding the user's preferences and related data regarding the user. In other embodiments, the selection is processed manually. For example, a message may be sent to a branch manager, who may then coordinate selection of a specific representative and the placement of the appointment on the representative's calendar. The representative chosen by the branch manager may be the individual having the financial expertise that meets the user's preferences. In other embodiments, the representative may be provided with credit scores, net worth information regarding the user by third party information providers 194. In another embodiment, the user may submit other documents pertaining to the user's inquiry with the user preferences (e.g., electronic mortgage documents or other documents relating to their accounts). In another embodiment, the user may start a service or product purchase online, and complete the purchase in-person with the representative. For example, the user may upload a partially filled application for a financial product as part of completing the preferences submission in step 205. The partially filled application may be provided to the consulting representative by the notification logic 125 for completion of the transaction. As another example, the user may initiate transactions relating to foreign exchange orders or small business treasury transactions in the on-line banking area of the website, and the representative may be provided with access to those partially completed transactions such that the transactions may be completed during the in-person appointment.

Figure 5:
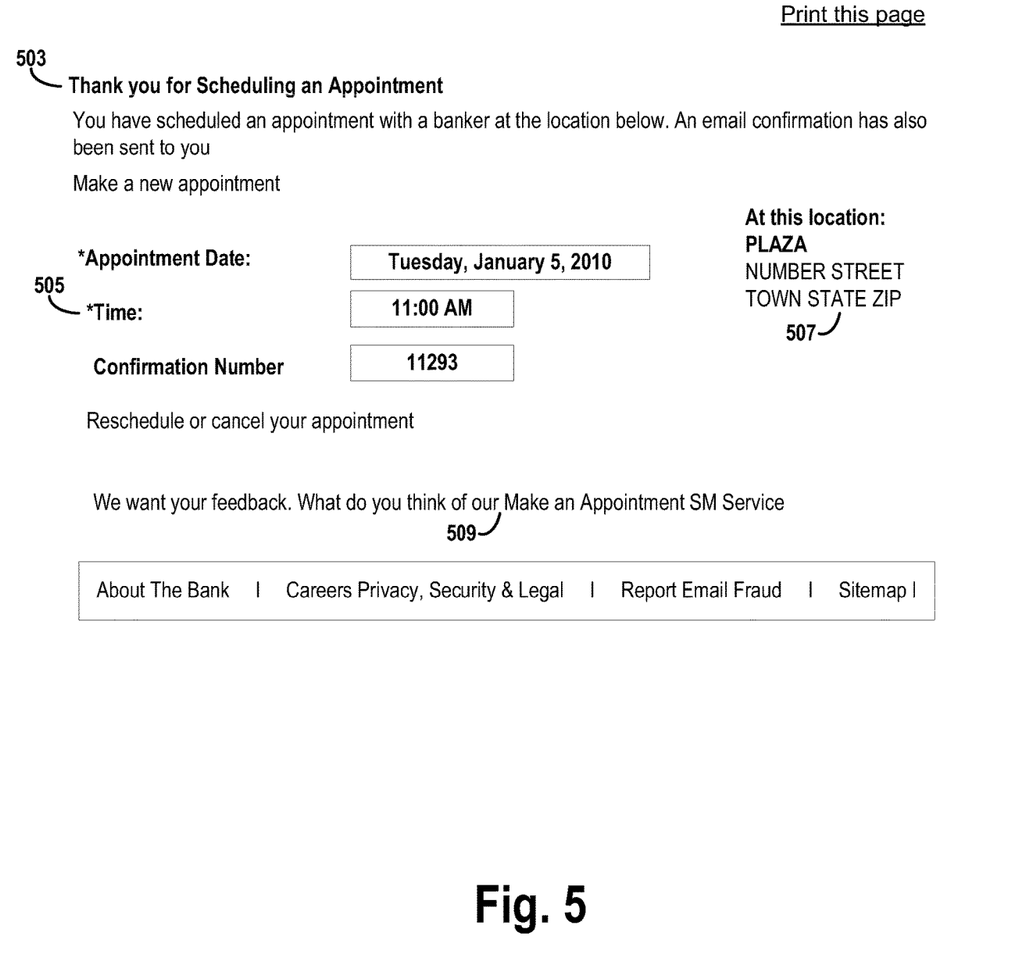
FIG. 5 is a screen shot of a thank you screen that may be shown to a user after scheduling an appointment according to an example embodiment.

Next, at step 213, the notification logic 125 may send confirmations to the user confirming the appointment. FIG. 5, discussed in greater detail below, is an example of a confirmation screen display that may be provided to a user immediately after the appointment is scheduled. In other embodiments, a confirmation message (e.g., e-mail, SMS text message, etc.) may be sent to the customer by the computer system 105 after scheduling an appointment. FIG. 6, discussed in greater detail below, is an example of such a confirmation message sent as an e-mail. As another example, a reminder message may be provided to a user immediately prior (e.g., one day preceding) the scheduled appointment. The confirmation and reminder messages may be sent to an address (e.g., e-mail address, cell phone number, etc.) that the user has registered with the financial institution or to an address that the user provided as part of scheduling the appointment. In another embodiment, where the user accesses the appointment scheduling system through a secure on-line banking area of the website of the financial institution, and the on-line banking area provides a messaging system for sending messages between the user and the financial institution, the message may be sent through the on-line banking messaging system.

The notification logic 125 may send a confirmation to the representative confirming the appointment. For example, the notification logic 125 may place the appointment in the representative's calendar in the sales platform and calendaring logic 130. As another example, an e-mail may alert the representative that an appointment has been placed on the representative's calendar to meet with the user. In yet another embodiment, a financial institution may use an instant messaging or internal communication system to notify the representatives. As another example, an e-mail may be sent to a shared mailbox that belongs to the financial institution. The mailbox may be shared among various bank managers who may be employees of the financial institution.

At step 215, the representative may meet with the user and enter a disposition for each appointment in the reporting/tracking logic 150. During the appointment, the scheduling system 120 may provide the representative with documents or transaction IDs uploaded by the user when scheduling the appointment, as described below. As another example, the representative may be provided with recommendations of particular products or services that may be of interest to the user. After the appointment, the representative may then forward the results or disposition regarding each appointment to the branch manager. The branch manager may send the dispositions to a regional bank contact for tracking and reporting purposes. In another embodiment, a sales platform of the financial institution may capture the dispositions of each appointment from each representative and the representative may not need to send the dispositions to the branch manager. Thus, the appointment results (e.g., sales) may be communicated to the sales platform of the financial institution, so that appropriate sales credit may be assigned. Alternatively, if the transaction was not completed, the information may be entered into the sales platform for follow-up at a later date. Other follow-up may also be conducted, such as sending a thank you card to the user that may be personally signed by the representative that attended the appointment. Similarly, for customers that have opted into receiving promotional information, customer information obtained during or in connection with the appointment may be entered into a lead management system of the financial institution.

Referring to FIG. 3a, FIG. 3a is a screen shot of an access point that may permit access to the processing system 100 of FIG. 1. In various embodiments, within the website of the financial institution, the user may click on a link to show branch locations, and the appointment scheduling logic 120 may be accessed through the bank locator search results page. As other examples, the access point may be accessed from an online application (e.g., an online loan application), via chat, from the online banking pages, or from other areas. A link 301 may be labeled "Meet with a Representative" and may be selected by the user to schedule an appointment with a representative. When a user clicks on the link, the user is directed to a webpage such as the one shown in FIG. 4. Additionally, other links may also be provided. For example, each location that may have representatives providing appointments may have a calendar icon 303 that is a link to show stores hours and schedule an appointment. In another embodiment, a link 305 may also be provided in the hours column of each participating bank location.

Referring to FIG. 3b, FIG. 3b is a screen shot of another access point for accessing the processing system 100 of FIG. 1. For example, when a third party search engine (e.g., Google, Bing, Yahoo etc.) is utilized by the user, the screen shot shown in FIG. 3b may be displayed as part of the search results page that is returned to the user. In particular, the screen shot shows a button 310 that allows a user to choose to make an appointment. When a user clicks on the button, the user is directed to a webpage such as the one shown in FIG. 4.

Referring to FIG. 3c, FIG. 3c is a screen shot of another access point for accessing the processing system 100 of FIG. 1. For example, FIG. 3c shows a link 320 that allows a user to provide their address and perform a search for a banking location nearest to the address provided by the user. For example, the access point shown in FIG. 3c may be provided as part of a website of an automotive dealer, and may be used to facilitate the user obtaining an auto loan for a new car purchase from the auto dealer. As another example, the access point shown in FIG. 3c may be provided as part of a website of a real estate company, and may be used to facilitate the user obtaining a mortgage loan for a new home purchase from the real estate company. As will be appreciated, other access points for scheduling appointments may also be provided. For example, an access point may be provided as part of a top-level menu at an automated teller machine or as one of the menu options when a user calls a toll-free number of the financial institution.

Referring to FIG. 4, FIG. 4 is a screen shot of a form that allows a user to enter user preferences according to an example embodiment. On the form shown in FIG. 4, the user may choose between making a new appointment, viewing or rescheduling an existing appointment, or cancelling an existing appointment. If the user chooses to make a new appointment, then the user is prompted to select a date and time by using pull down menus 405. In field 407, a location of the meeting is shown. The location in field 407 may, for example, be populated automatically based on a knowledge of where the user prefers to conduct in-person banking with the financial institution (e.g., where the user is an existing customer and has conducted a number of transactions with the financial institution in the past at a particular location). Alternatively, the location in field 407 may be populated based on a known geographic location of the user as provided though geo-coding by the location determination logic 127. As another example, the user may be provided with a series of menu selections (e.g., within a predetermined distance of a specified zip code, within a certain city/state, and so on), and a range of options meeting the user-specified criteria may be provided.

In field 407, the user is prompted to select the type of appointment (e.g., in person at a branch location, telephone appointment with a representative at a call center, chat session, etc.). Next, the user may be prompted to provide personal information such as name 410, e-mail address, or phone number. Such information may also be populated automatically, for example, if the user has been identified based on login information provided as part of logging into a secure area of the website. The user may be asked to provide optional information such as, whether the user is a current customer of the bank in field 415. If the user is a current customer of the bank, then the bank processing system 100 may provide the user's account information to the representative, prior to the meeting. In another embodiment, the user may be asked further information regarding the appointment. For example, the user may be prompted to indicate the type of financial product the user would like to discuss during the appointment. Such information may be provided as text in field 421. In various embodiments, the user may rate the areas of appointment to allow the rules engine logic to choose based on the weighted average of the preferences. In various embodiments, the user may be able to choose morning, afternoon or evening appointment preferences. A link 422 may allow the user to attach documents which may be discussed or acted upon to complete a transaction during the appointment. Alternatively, if the user has initiated a transaction, such as the purchase of a product or service, the user may provide a transaction ID in field 424. The transaction ID may then be used by the representative to help locate the pertinent information for the transaction. Information regarding the transaction may also be provided to the representative automatically, e.g., where the user accesses the appointment scheduling logic 120 from an access point that was provided on a web page associated with the pending transaction (e.g., a web page in which the user was entering information for a pending foreign exchange order). The user may also be asked to specify a preferred language for the appointment in field 426. In one embodiment, once the user selects link 427 to make an appointment, the appointment is scheduled and e-mail confirmations are sent. In one embodiment, once the user selects link 427 to make an appointment, the user is provided with a plurality of appointment options (e.g., different representatives at different locations selected by the rules engine 121 based on the preferences provided by the user). Based on the options provided, the user may then make a final selection, at which point the appointment is scheduled and e-mail confirmations are sent.

In the example of FIG. 4, the user is permitted to specify various preferences regarding the appointment to be scheduled. As will be appreciated, the user may also be permitted to specify fewer, additional, and/or different preferences. In an example embodiment, the rules engine 121 is configured to provided a ranked listing of recommended representatives based on the preferences provided by the user. In another embodiment, the rules engine 121 is configured to provide a ranked listing of recommended branch locations based on the preferences provided by the user. Other resources in addition to branch locations and representatives may also be ranked.

For example, if a ranked listing of recommended representatives is provided, each of the categories of preferences may be assigned a default weighting. A score may then be developed for each representative which represents how well the representative matches the preferences provided by the user. For example, the score may be incremented by fifty points if the representative is within five miles of a preferred location, 25 points if the representative is within 10 miles of the preferred location, and so on. Various points may be added based on how well each representative meets each given criteria. The preferences may also relate to how knowledgeable the representatives are about various types of products and services. Such assessments (including the points to be added for each potential preference in each category for each representative) may be made by one or more users (e.g., various branch managers) involved in programming the rules engine 121. As another example, the extent to which each representative meets each potential preference in each category may be rated on a scale (e.g., 1-10), and the score may be a weighted average of the ratings for the preferences selected by the user in the various categories. As will be appreciated, some preferences may be used to disqualify certain representatives altogether. For example, if a user only speaks Spanish, then representatives that do not speak Spanish may be eliminated from the list. The remaining representatives may then be ranked based on their score, and a ranked list of options may be provided to the user.

In another example embodiment, the user may be permitted to further specify the importance of one or more of the preferences. For example, the user may assign a high importance to the language preference, e.g., if the user understands only one language. Conversely, a customer that is fluent in both English and Spanish may assign a lower importance to this preference. The weightings assigned by the user may then be taken into account by the rules engine 121 in developing the scores of the various representatives. For example, for the bilingual customer, the weight given to the language preference may assigned a value of zero or otherwise reduced.

The weighting may also be based on factors other than those specified by the user. For example, other internal information may be used. For example, the rules engine 121 may be configured to perform an analysis of account data of the user in order to place the user into one of a number of customer segments. The rules engine 121 may then be configured to select only representatives that serve that customer segment, or to place those representatives higher in the ranked listing. As another example, external information may also be used, such as information obtained from a credit report of the user.

If a ranked listing of recommended branch locations is provided, the ranking may be generated based the rankings of individual representatives at the branch locations (e.g., such that the branch location of the first-ranked representative is also ranked first), based on how well the group of representatives at a given branch location collectively meet the preferences specified by the user, or in another manner. As another examples, rather than have the branch managers perform assessments of individual representatives and enter that information into the rules engine 121, the assessments may be of branch locations and the ranking may be at the level of granularity of individual branch locations.

Referring to FIG. 5, FIG. 5 is a screen shot of a "thank you" screen that may be shown to the user after scheduling an appointment according to an example embodiment. The thank you screen shows a thank you note 503 that states, "Thank you for scheduling an appointment." In this embodiment, in field 505, the appointment date, appointment time and confirmation number are displayed to the user. Also shown in FIG. 5, in field 507, is the location of where the user will meet with a representative. Also shown in FIG. 5 is a link 509 that allows a customer to provide feed back regarding the appointment service. In an example embodiment, the screen may also contain a link that allows a user to place a calendar reminder on the user's default calendar program (e.g., to export the calendar appointment to Microsoft Outlook®).

Referring to FIG. 6, FIG. 6 is a screen shot of a confirmation message that may be sent to the user after scheduling an appointment according to an example embodiment. In the example of FIG. 6, the confirmation message is sent as an e-mail. As previously indicated, however, other messaging arrangements may also be used. The contents of the message may provide the appointment date, time, location, confirmation number, the name that the user provided and the user's interests that the user selected. The message may also indicated any additional documents that are needed in field 603. The information in field 603 may, for example, be provided by the representative after the representative has had an opportunity to review the information provided by the user and any related information obtained from the computing system 105. In an example embodiment, the message may also contain a link that allows a user to place a calendar reminder on the user's default calendar program. The message may also contain a link 605 for the user to obtain a map or directions to the specified location. The message may also have a link 607 that allows a user to reschedule or cancel an appointment. The message may also have a link 609 that prompts the user to confirm that they will attend the appointment. As will be appreciated, the user may also be given the ability to specify their preferred mode of communication for the appointment reminder (e.g., telephonic reminder, SMS reminder, e-mail reminder, and so on).

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention as defined in the appended claims. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention as expressed in the appended claims.

What is claimed is:

1. A computerized method for scheduling an appointment between a user and a resource of a financial institution, the method comprising:
   prompting, by scheduling logic of a computer system, the user to provide a first user-selected preference;
   prompting, by the scheduling logic, the user to provide a first preference weight for the first user-selected preference, the first preference weight being within a first range of weights;
   prompting, by the scheduling logic, the user to provide a second user-selected preference;
   prompting, by the scheduling logic, the user to provide a second preference weight for the second user-selected preference, the second preference weight being within a second range of weights;
   receiving, by a rules engine of the computer system, the first user-selected preference, the first preference weight, the second user-selected preference, and the second preference weight while the user is using a communication device to conduct a network-based session with the rules engine;
   accessing, by the rules engine, matching data stored in a data storage system, the matching data including characteristics regarding the resource;
   calculating, by the rules engine, one or more preference match scores for the resource, each preference match score corresponding to at least one of the first user-selected preference or the second user-selected preference based on the characteristics of the resource;
   calculating, by the rules engine, an individual user total match score for the resource and specific to the user using a weighted average of the one or more preference match scores weighted by the first preference weight and the second preference weight;
   determining, by the rules engine, that the resource has a highest individual user total match score out of all the resources of a set of resources;

receiving, by the rules engine, information associated with the user from a third party information provider;

providing, by the rules engine, the information associated with the user to the resource; and scheduling, by the scheduling logic, the appointment for the user with the resource based on the determination that the resource has the highest individual user total match score.

2. The method of claim 1, further comprising:

accessing, by the scheduling logic, inventory logic to determine an availability of the resource; and rescheduling, by the scheduling logic, the appointment after determining that the resource is unavailable;

wherein the resource is a branch location of the financial institution.

3. The method of claim 1, wherein the resource is a representative of the financial institution.

4. The method of claim 3, further comprising permitting the user to upload a document during the network-based session and providing the document to the representative for use during the appointment.

5. The method of claim 3, wherein, during the network session, transaction information is received from the user regarding a transaction, and wherein, during the appointment, the representative is provided with access to the transaction information received from the user and uses the transaction information to complete the transaction.

6. The method of claim 3, further comprising sending messages to both the user and the representative with appointment information regarding the appointment.

7. The method of claim 3, wherein the representative is at least one of a customer service representative, a banker, an investment advisor, a financial advisor, or a mortgage consultant.

8. The method of claim 1, further comprising:

selecting, by the rules engine, a subset of the resources;

generating a display to be provided to the user, the display presenting a plurality of options that include location for the subset; and receiving a user selection of one of the plurality of options.

9. The method of claim 1, wherein the network based session is a secure online banking session conducted via a website of the financial institution.

10. The method of claim 1, wherein the network based session is a banking session conducted via an automated teller machine.

11. The method of claim 4, wherein the uploaded document includes a partially filled application for a financial product.

12. A computer-implemented method for scheduling an appointment with a user, the method comprising:

receiving, at a computing system associated with a financial institution, a first user-selected preference;

receiving, at the computing system, a first preference weight of the first user-selected preference;

receiving, at the computing system, a second user-selected preference;

receiving, at the computing system, a second preference weight of the second user-selected preference;

accessing, by a rules engine of the computing system, matching data stored in a data storage system, the matching data including characteristics regarding a plurality of representatives of the financial institution;

calculating, by the rules engine, one or more preference match scores for each representative of the plurality of representatives, each preference match score corresponding to one of the first user-selected preference or the second user-selected preference, based on the characteristics of the representative;

calculating, by the rules engine, an individual user total match score for each representative of the plurality of representatives specific to the user using a weighted average of the one or more preference match scores weighted by the first preference weight and the second preference weight;

generating, using the rules engine, a ranked list of the plurality of representatives based on their respective individual user total match scores;

generating, by the computing system, a display comprising the ranked list and transmitting the display to the user;

receiving, by the computing system, a user selection of at least one of the plurality of representatives from the list;

receiving, by the rules engine, information associated with the user from a third party information provider;

providing, by the rules engine, the information associated with the user to the selected representative; and scheduling, by scheduling logic of the computing system, the appointment between the selected representative and the user, including scheduling the appointment in a calendaring and sales platform of the selected representative.

13. The method of claim 12, further comprising:

accessing, by the scheduling logic, inventory logic to determine an availability of the selected representative; and rescheduling, by the scheduling logic, the appointment after determining that the selected representative is unavailable;

wherein at least one of the first user selected preference or the second user selected preference comprises preferences relating to at least one of: a type of the appointment, a location of the appointment, or a timing of the appointment.

14. The method of claim 13, wherein the type of appointment preference comprises at least one of a telephone conversation, meeting at a store, or an online chat session.

15. The method of claim 12, further comprising providing user data to the selected representative during the appointment, the user data comprising a partially filled application for a financial product.

16. The method of claim 15, wherein the partially filled application was prepared by the user during an online banking session on the computing system.

17. The method of claim 12, further comprising generating another ranked list for the user responsive to the selected representative becoming unavailable for the appointment.

18. The method of claim 12, wherein the selected representative is at least one of: a customer service representative, a banker, an investment advisor, a financial advisor, or a mortgage consultant.

19. The method of claim 12, further comprising generating reports displaying results regarding a plurality of appointments.

20. The method of claim 17, further comprising:

providing the user with at least one of: a first option of communicating via e-mail, a second option of communicating via short message service (SMS) messages, or a third option of communicating via voice messages;

receiving a selection from the user of at least one of the first option, the second option, or the third option; and providing reminders to the user after scheduling the appointment using the selected at least one of the first option, the second option, or the third option.

21. A method for remotely scheduling an in person appointment with a user, the method comprising:
   receiving, using a network interface logic, a first user-selected preference;
   receiving, using the network interface logic, a first preference weight associated with the first user-selected preference;
   receiving, using the network interface logic, a second user-selected preference;
   receiving, using the network interface logic, a second preference weight associated with the second user-selected preference;
   accessing, by a rules engine of a computer system, matching data stored in a data storage system, the matching data including characteristics regarding at least one resource of a financial institution;
   calculating, by the rules engine, one or more preference match scores for the at least one resource, each preference match score corresponding to at least one of the first user-selected preference or the second user-selected preference, based on the characteristics of the at least one resource;
   calculating, by the rules engine, an individual user total match score for the at least one resource specific to the user using a weighted average of the one or more preference match scores weighted by the first preference weight and the second preference weight;
   generating, using the rules engine, a ranked list including the at least one resource, the ranked list based on the individual user total match score;
   receiving, from the user, a selection of the at least one financial institution resource included in the ranked list;
   displaying, using scheduling logic of the computer system, an availability of the selected financial institution resource during an upcoming month;
   receiving, from the user, an appointment scheduling request;
   receiving, by the rules engine, information associated with the user from a third party information provider; and
   providing, by the rules engine, the information associated with the user to the selected financial institution resource.

22. The method of claim 21, further comprising rescheduling, by the scheduling logic, the appointment based on the availability of the selected financial institution resource;
   wherein the selected financial institution resource is a branch location of the financial institution.

23. The method of claim 21, wherein the selected financial institution resource is a representative of the financial institution.

24. The method of claim 23, wherein the first user-selected preference and the second user-selected preference are received at a first computing system associated with the financial institution, wherein the first user-selected preference and the second user-selected preference are received while the user is using a second computing system to conduct a network-based session with the first computing system, and wherein the method further comprises:
   permitting the user to upload a document during the network-based session; and
   providing the document to the representative for use during the appointment.

25. A method for remotely scheduling an in person appointment with a user, the method comprising:
   receiving, using a network interface logic, a first user-selected preference;
   receiving, using the network interface logic, a first preference weight associated with the first user-selected preference;
   receiving, using the network interface logic, a second user-selected preference;
   receiving, using the network interface logic, a second preference weight associated with the second user-selected preference;
   accessing, by a rules engine of a computer system, matching data stored in a data storage system, the matching data including characteristics regarding a plurality of resources of a financial institution;
   calculating, by the rules engine, one or more preference match scores for each resource of the plurality of resources, each preference match score corresponding to at least one of the first user-selected preference or the second user-selected preference based on the characteristics of the resource;
   calculating, by the rules engine, an individual user total match score for each resource of the plurality of resources specific to the user using a weighted average of the one or more preference match scores weighted by the first preference weight and the second preference weight;
   generating, using the rules engine, a ranked list of the plurality of resources based on their respective individual user total match scores;
   displaying identifying information of at least one of the plurality of resources of the ranked list, the identifying information capable of being sorted using various criteria;
   receiving, from the user, a selection of one of the plurality of resources of the ranked list;
   displaying, using scheduling logic of the financial institution, an availability of the selected resource;
   receiving, from the user, an appointment scheduling request;
   receiving, by the rules engine, information associated with the user from a third party information provider; and
   providing, by the rules engine, the information associated with the user to the selected resource;
   accessing, by the scheduling logic, inventory logic to determine an availability of the selected resource; and
   rescheduling, by the scheduling logic, the appointment after determining that the selected resource is unavailable;
   wherein the selected resource is a representative of the financial institution;
   wherein the first user-selected preference and the second user-selected preference are received at a first computing system associated with the financial institution,
   wherein the first user-selected preference and the second user-selected preference are received while the user is using a second computing system to conduct a network-based session with the first computing system,
   wherein, during the network session, transaction information is received from the user regarding a transaction, and
   wherein, during the appointment, the first computing system provides the representative with access to the transaction information received from the user and uses the transaction information to complete the transaction.

\* \* \* \* \*